United States Patent [19]

Ihara

[11] Patent Number: 5,172,957
[45] Date of Patent: Dec. 22, 1992

[54] FLUID PRESSURE CONTROL APPARATUS
[75] Inventor: Yoshifumi Ihara, Kanagawa, Japan
[73] Assignee: Nippon Air Brake Co., Ltd., Kobe, Japan
[21] Appl. No.: 696,182
[22] Filed: May 6, 1991
[30] Foreign Application Priority Data May 18, 1990 [JP]  Japan .................. 2-52395[U]

[51] Int. Cl.<sup>5</sup> ............................................. B60T 8/32
[52] U.S. Cl. ..................................... 303/9.75; 188/349
[58] Field of Search ............... 303/9.62, 9.75, 9.72, 303/9.73; 188/349

[56] References Cited

U.S. PATENT DOCUMENTS

| | | | |
|---|---|---|---|
| 3,283,504 | 11/1966 | Stelzer | 303/9.73 |
| 3,572,845 | 3/1971 | Johannesen | 303/9.73 |
| 3,880,471 | 4/1975 | Lewis | 303/9.73 |
| 4,111,494 | 9/1978 | Young | 303/9.75 X |
| 4,265,491 | 5/1981 | Shutt | 303/9.73 |
| 4,709,968 | 12/1987 | Tanaka et al. | 303/9.75 |
| 4,893,878 | 1/1990 | Cole et al. | 303/9.75 |
| 5,018,796 | 5/1991 | Ishimaki et al. | 303/9.75 |

FOREIGN PATENT DOCUMENTS 283556 11/1990 Japan .

Primary Examiner—Robert J. Oberleitner
Assistant Examiner—Lee W. Young
Attorney, Agent, or Firm—James P. Ryther

[57] ABSTRACT

In a fluid pressure control apparatus for a vehicle which includes a main body in which an input opening is formed in communication with a master cylinder side and an output opening is formed in communication with a wheel cylinder side, a stepped bore made in the main body, in communication with the input opening and output opening; a stepped piston slidably fitted into the stepped bore, a poppet type movable body for limiting fluid flowing from the wheel cylinder side towards the master cylinder side in response to a predetermined length movement of the stepped piston; a path for connecting the input opening side of the stepped piston with the output opening side of the stepped piston; and a valve for closing the path in response to a movement longer than the predetermined length. For controlling the stepped piston movement, there are provided a first spring for always urging the stepped piston in a direction to open the valve and a second spring for urging the stepped piston in the direction to open the valve whenever the movement longer than the predetermined length has occurred.

7 Claims, 2 Drawing Sheets

FLUID PRESSURE CONTROL APPARATUS

BACKGROUND OF THE INVENTION

1. Field of the Invention

This invention relates to a fluid pressure control apparatus which is used in a brake system for vehicle, and more particularly to a fluid pressure control apparatus which is used in a brake system provided with an anti-skid control apparatus.

2. Description of the Prior Art

In a brake circuit for vehicle, different control apparatus are arranged for securing the safety on the braking.

One representative example of the control apparatus is a fluid pressure control valve. Another example thereof is an anti-skid control apparatus.

The anti-skid control apparatus controls automatically the brake fluid pressure to prevent the wheel from looking. In the control operation, brake fluid is discharged into a relieving circuit, and it is pressurized and returned to the master cylinder side by a fluid pressure pump.

When the pressurized brake fluid is returned to the master cylinder, the Pulsation of the fluid pressure pump is transmitted through the brake pedal to the driver. The driver feels uncomfortable. Accordingly, it is preferable to arrange a throttle for damping the pulsation of the pressurized brake fluid discharged from the fluid pressure pump.

This Assignee previously proposed the fluid pressure control apparatus for the above described purpose in the Japanese Patent Application No. 69023/1990 which includes, a main body in which an input opening is formed in communication with a master cylinder side and an output opening is formed in communication with a wheel cylinder side a stepped bore made in the main body, in communication with the input opening and output opening a piston slidably fitted into the stepped bore a path for connecting the input opening side of the piston with the output opening side of the piston valve means arranged in the path for limiting the pressure rise of the output opening side, being closed and opened in response to movements of the piston ; a preloaded spring for urging the piston in a direction to open the valve means, a movable body arranged at the output opening side of the piston, being movable in accordance with the movement of the piston, a valve seat onto which the movable body seats with the movement of the piston to the input opening side, and a throttle for throttling the fluid flow towards the input opening side from the output opening side on the seat of the movable valve body, and in which a control piston is provided for moving the movable body to the valve seat towards the input opening side against the spring force of the preloaded spring, receiving the fluid pressure of the output opening side or input opening side of the throttle at its one end, while the valve means is still opened.

In the proposed fluid pressure control apparatus, the control piston receives the output side pressure of the throttle or the input side pressure thereof, and it makes the piston move against the preloaded spring to the position at which the movable body seats on the valve seat, maintaining the fluid pressure control valve opened.

When the control piston is moved to the master cylinder side against the urging force of the preloaded spring with the input side pressure of the throttle or the output side pressure thereof, the throttle is changed over from the inoperative condition into the operative condition.

Accordingly, when the fluid pressure is altered for the change-over of the inoperative condition into the operative condition, the effective fluid pressure receiving areas of the control piston should be changed. Thus, the diameter of the control piston and that of the stepped bore should be changed. The size of the whole apparatus should be large-sized. The respective parts cannot be used in common.

SUMMARY OF THE INVENTION

Accordingly, it is an object of this invention to provide a fluid pressure control apparatus which is simple in construction and can change easily an effective throttle fluid pressure.

In accordance with an aspect of the invention, in a fluid pressure control apparatus for vehicle including (A) a main body in which an input opening is formed in communication with a master cylinder side and an output opening is formed in communication with a wheel cylinder side ; (B) a stepped bore made in said main body, in communication with said input opening and output opening (C) a stepped piston slidably fitted into said stepped bore having a smaller diameter portion at the input opening side and a larger diameter portion at the output opening side; (D) throttle means for limiting fluid flowing from the side of said output opening towards the side of said input opening in response to a predetermined length movement of said piston ;(E) a path for connecting the input opening side of said piston with the output opening side of said piston (F) valve means for closing said path in response to a longer movement of said stepped piston than said predetermined length and (G) an urging apparatus for urging said piston in a direction to open said valve means wherein when said smaller diameter portion and said larger diameter portion receive an equal fluid pressure, said stepped piston is movable in a direction to close said valve means, and said valve means cooperates with said stepped piston and said urging apparatus so that, when the pressure of the fluid supplied from the master cylinder side towards the wheel cylinder side rises up to a control start pressure, said valve means closes and then repeatedly opens and closes with the forward and backward movement of said stepped piston for increasing the fluid pressure of the wheel cylinder side at a reduced rate relative to the fluid pressure of the master cylinder side, the improvement in which said urging apparatus comprises a first spring for always urging said piston in a direction to open said valve means, and a second spring for urging said piston in a direction to open said valve means in response to a movement longer than said predetermined length, said control start pressure being determined by the spring fore of said second spring, and wherein said second spring does not work until said stepped piston is subjected to movement to the input opening side for a distance longer than said predetermined length.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, a fluid pressure control apparatus according to one embodiment of this invention will be described with reference to the drawings.

Figure 1:
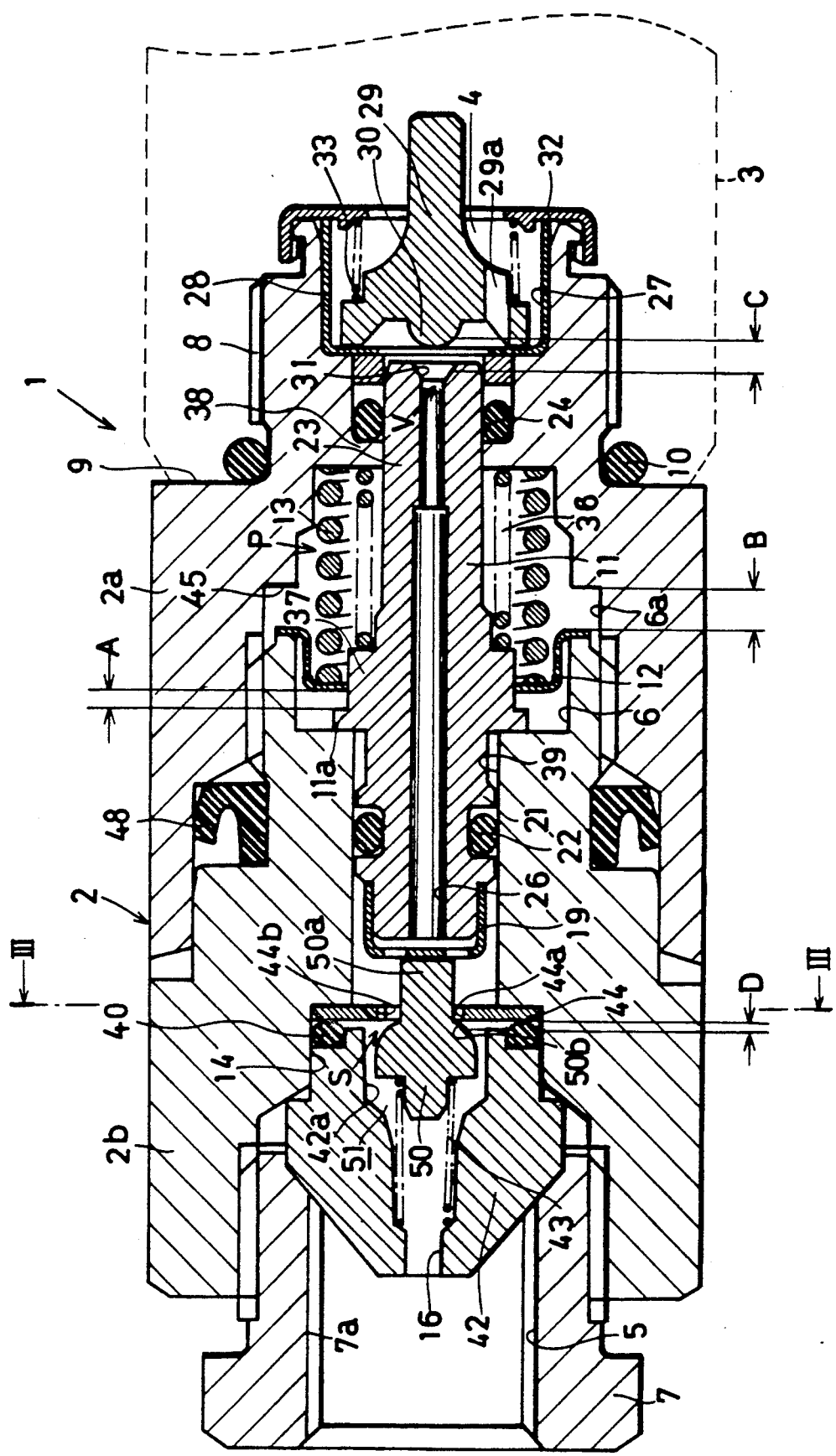
FIG. 1 is a cross-sectional view of a fluid pressure control apparatus according to one embodiment of this invention.

In FIG. 1, a reference numeral 1 represents generally the whole of the fluid pressure control apparatus according to this embodiment.

In this fluid pressure control apparatus for a vehicle, a main body 2 is screwed to a master cylinder 3, as shown by dashed lines. The cylindrical main body 2 consists of a first body portion 2a and a second body portion 2b which are screwed to each other as one body. A cup seal 48 is interposed between the first body portion 2a and the second body portion 2b. The first body portion 2a has an input opening 4 to which the master cylinder 3 is connected. A coupling member 7 is screwed to the second body portion 2b. The coupling member 7 has an outlet opening 5. Screw threads 7a are made in an inside surface of the coupling member 7. A not-shown conduit is screwed into the female screw 7a of the coupling member 7. Another end of the conduit is connected to a not-shown anti-skid apparatus.

Screw threads 8 are made on the peripheral surface of the end portion of the first body portion 2a. A seal ring 10 interposed between the screw threads 8 and a side wall portion 9 of the first body portion 2a.

A stepped piston 11 is slidably fitted into the stepped bore 6 formed between the first body portion 2a and the second body portion 2b. A through axial path 26 is made in the piston 11. A larger-diameter portion 21 of the piston 11 provided with a seal ring 22 is slidably fitted to a bore portion 39 of the second body portion 2b. The seal ring 24 is fitted into the annular groove formed in the larger-diameter portion 21 of the piston 11. The smaller-diameter portion 23 of the piston 11 is slidably fitted into the central hole of the first body portion 2a in which a seal ring 24 is fitted.

A cup-shaped contact member 19 is fitted to one end portion of the piston 11 at the side of the outlet opening 5. There is some clearance for fluid path between the cup shaped contact member 19 and the end surface of the piston 11.

A cylindrical member 28 is securely fitted into a bore portion 27 made in the right end portion of the first body portion 2a. A poppet-type valve body 29 is arranged in the cylindrical member 28. A top end of the poppet-type valve body 29 is facing into a not-shown fluid pressure generating chamber of the master cylinder 3.

A through path 29a is made in a bottom portion of the poppet-type valve body 29. A central round projection 30 is facing to a valve seat 31 formed on the top end of the piston 11. Thus, a valve V is constituted by the poppet-type valve body 29 and the valve seat 31. The poppet-type valve body 29 is urged towards the valve seat 31 by a valve spring 33. A cover member 32 is fitted into the cylindrical member 28. The valve spring 33 is compressedly extended between the cover member 32 and the bottom portion of the poppet-type valve body 29. The cover member 32 is engaged with an annular groove made in the opening end portion of the first body portion 2a.

A first spring 36 for urging always piston 11 in a direction to open the valve V and a second spring 13 for urging the piston 11 to the direction to open the valve V at the time when the piston 11 is moved more than a predetermined length, are arranged in a larger-diameter portion 6a of the stepped bore 6 of the main body 2. Thus, an urging apparatus P is constituted by the first spring 36 and second spring 13.

One end of the first spring 36 is received by a stepped portion 37 of the piston 11 and another end thereof is received by a stepped portion 38 of the first body portion 2a. One end of the second spring 13 is received by a cup-shaped spring retainer 12 which has a central opening, and another end thereof is received by the stepped portion 38 of the first body portion 2a. The spring retainer 12 is freely received by the stepped portion 37 of the piston 11. It can move towards the side of the input opening 4 from the shown position.

A conduit member 42 is arranged in an output chamber 51 formed in the second body portion 2b and it is prevented from falling off, by the coupling member 7. A cylindrical portion of the conduit member 42 is fitted firmly into the bore portion 14 of the second body portion 2b. A seat member 44 is arranged in the bore portion 14. A seal ring 40 is interposed between the seat member 44 and the conduit member 42.

Figure 3:
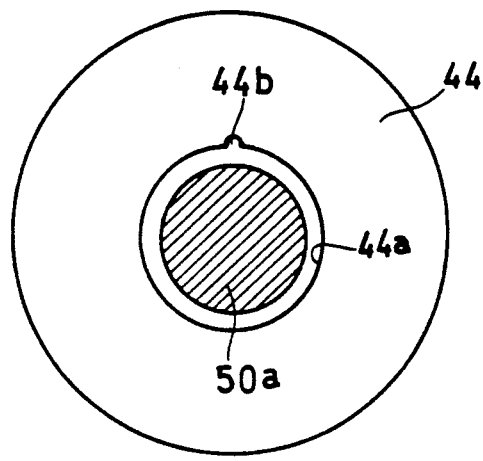
FIG. 3 is a cross-sectional view taken along the line III—III in FIG. 1.

In the assembling step of the apparatus, the conduit member 42 is first inserted into the bore portion 14 and then the coupling member 7 is screwed into the second body portion 2b. Thus, the seat member 44 is positioned through the conduit member 42. A opening 44a is formed in the central portion of the seat member 44 as shown in FIG. 3. The peripheral edge thereof functions as a valve seat. A cut-out 44b is further formed in the opening 44a. The cut-out 44b constitutes a path for throttling. A poppet-type movable body 50 is arranged in a recess 42a of the conduit member 42 and it is urged towards the side of the inlet opening 4 by a valve spring 43 which is compressedly extended in the recess 42a of the conduit member 42.

A rod portion 50a of the movable body 50 passes through the opening 44a of the seat member 44 and a top end of the rod portion 50a contacts with the contact member 19. Accordingly, the movable valve body 50 is regulated for its forward stop position. Further a clearance (valve lift) is made between the seat member 44 and the movable body 50. The outlet port 5 formed in the coupling member 7 and the recess 42a of the conduit member 42 communicate with each other through a path 16 formed in the conduit member 42.

When the poppet-type body 50 contacts with the seat member 44, the cut-out 44b formed in the seat member 44 functions as throttle S for throttling the fluid flow in a direction towards the side of the inlet opening 4 from the side of the outlet opening 5. In the shown condition a spherical portion 50b of the movable body 50 is separated from the seat member 44 and so the throttle S becomes inoperative.

In the fluid pressure control apparatus 1 provided with the above-mentioned throttle means S and valve V, a distance A from the bottom portion of the spring retainer 12 to the flange portion 11a of the piston 11 is smaller than another distance B from the flange portion of the spring retainer 12 to the stepped portion 45 of the first body portion 2a. Further, the distance that the piston 11 can be moved in the stepped bore 6, namely the distance A plus the distance B is larger than a further distance C from the valve seat 31 of the piston 11 to the round projection 30 of the poppet-type valve body 29. A further distance D that the movable body 50 move to close the opening 44a of the seat member 44 by the spherical portion 50b, is smaller than the distance A. According to this embodiment, under the above conditions, the following ratios are employed A=0.8, B=1.0, C=1.49 and D=0.5.

Next, there will be described operations of the above described fluid pressure control apparatus 1.

When the not-shown brake pedal is not yet trodden by the driver, the respective parts are located at the shown positions. In the urging apparatus P, the valve V is opened by the urging force of the first spring 36. The second spring 13 does not act on the piston 11. Thus, the flange portion 11a of the piston 11 contacts with the stepped portion of the second body portion 2b. And the rod portion 50a of the movable valve body 50 contacts with the contact member 19 and it is prevented from moving rightwards. Thus, the throttle S is in inoperative condition.

In the shown condition, when the driver depresses the brake pedal, a fluid pressure is generated in the fluid pressure generating chamber of the master cylinder 3. The fluid pressure from the master cylinder 3 is supplied through the inlet opening 4, the axial path 26 of the piston 11 and the opening 44a of the seat member 44 into the outlet opening 5. With a further depression of the brake pedal by the driver, pressure difference between the receiving areas of the inlet side and outlet side of the piston 11 is so increased that the fluid pressure force overcomes the spring force of the first spring 36.

The piston 11 is moved rightwards compressing the first spring 36 and so the flange portion 11a of the piston 11 is separated from the stepped portion of the second body portion 2b. With the increase of the fluid pressure of the brake fluid, the piston 11 is moved further so that the movable body 50 contacts with the seat member 44. The movable valve body 50 follows the piston 11 with the urging force of the valve spring 43. Accordingly, the spherical portion 50b of the movable body 50 come to contact with the peripheral edge of the opening 44a of the valve-seat forming member 44. Thus, the throttle S becomes operative.

When the piston 11 has moved by the distance A, the flange portion 11a of the piston 11 contacts with the bottom portion of the spring retainer 12. After that, the piston 11 is urged leftwards both by the first spring 36 and by the second spring 13. With the increase of the fluid pressure, the piston 11 is moved rightwards against the spring forces of the first and second springs 36 and 13.

In some cases, while the piston 11 is moving, or before the fluid pressure does not yet rise up to the knee point pressure or control-start pressure, the wheel tennis to lock. The not-shown fluid pressure pump starts to be driven in the anti-skid apparatus, and the brake fluid is returned to the master cylinder 3 through the output opening 5 and the throttle S. According to this embodiment, even when the fluid pressure is lower than the knee-point pressure, or even before the fluid pressure control is started, the throttle S is operative. Accordingly, the pulsation of the fluid pressure pump is not transmitted through the brake pedal to the driver.

With the further increase of the brake fluid pressure, the movement length of the piston 11 reaches the distance C, and so the valve seat 31 contacts with the round projection 30 of the poppet-type valve body 29. Thus, the valve V is closed. The fluid pressure control starts. At that time, the flange portion of the spring retainer 12 is separated by a little distance from the stepped portion 38 of the first body portion 2a. The movable body 50 is separated from the contact member 19, and the throttle S is operative.

Accordingly, also in the case that the wheel tends to lock after the fluid pressure control start, the pressurized brake fluid from the fluid pressure pump of the anti-skid apparatus is returned through the throttle S into the master cylinder 3. Thus, the pulsation of the fluid pressure pump is attenuated and so pedal-kick force is not transmitted to the driver.

When the driver releases the brake pedal from treading, the fluid pressure in the interior of the master cylinder 3 becomes instantaneously negative (or very low), the piston 11 is moved rapidly to the side of the outlet opening 5 by the urging apparatus P. The contact member 19 comes to contact with the rod portion 50a of the movable body 50. The rod portion 50a of the movable body 50 is separated from the seat member 44, and it is returned to the shown position. The throttle S becomes inoperative.

Accordingly, the brake fluid from the rear wheel brake apparatus is freely returned through a large space between the movable body 50 and the seat member 44 into the master cylinder 3.

Before the throttle S is changed over from the inoperative condition into the operative condition, the piston 11 is urged only by the spring 36.

When the operative condition of the throttle S will be started at a lower fluid pressure, the first spring 36 for urging always the piston 11 may be substituted with a spring of smaller spring force. Thus, the fluid pressure that the piston 11 starts to move rightwards, can be lower, and so the effective fluid pressure for throttling can be lower.

Or when the operative condition of the throttle S will be started at a higher pressure, the first spring 36 for urging always the piston 11 may be substituted with a spring of larger spring force. Thus, the fluid pressure that the piston 11 starts to move rightwards, can be higher, and so the effective fluid pressure for throttling can be higher.

According to this embodiment, the effective fluid pressure for throttling can be easily altered by substituting the first spring 36. It is unnecessary to change the design cf the main body and the related parts. The apparatus is not large-sized.

Figure 2:
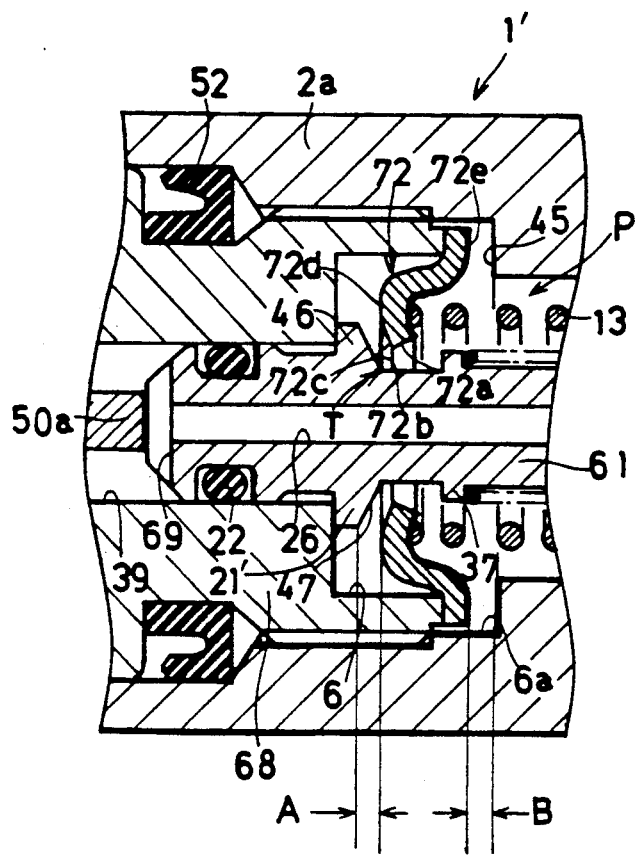
FIG. 2 is a cross-sectional view of an important part of a fluid pressures control apparatus according to another embodiment of this invention.

FIG. 2 shows an important part of a fluid pressure control apparatus according to a second embodiment of this invention. Parts in FIG. 2 which correspond to those in FIG. 1, are denoted by the same reference numerals, the description of which will be omitted.

In FIG. 2 a spring retainer 72 is different from the spring retainer of the first embodiment in shape. A flange portion 72e of the spring retainer 72 contacts with the end of the second body portion 2b. A piston 61 passes through a central opening 72a of the spring retainer 72. A tapered surface 72c is formed on a left peripheral edge of the central opening 72a. A tapered surface 47 is formed on a first flange portion 46 of the piston 61. The tapered surface 47 is substantially in parallel with the tapered surface 72c on the left peripheral edge 72b of the spring retainer 72. They are facing to each other. The distance between the tapered surfaces 47 and 72c is equal to the distance A. When the piston 61 is moved rightwards by the distance A. the tapered surface 72c of the spring retainer 72 comes to contact with the tapered surface 47 of the first flange portion 46 of the piston 61. A positioning means T is formed by the tapered surfaces 47 and 72c. Thus, the spring retainer 72 is positioned relative to the piston 61, when the tapered surfaces 47 and 72c contact with each other. The whole of the spring retainer 72 can be freely moved between the first flange portion 46 of the piston 61 and a second flange portion 37 thereof. However, the spring retainer 72 is prevented from deflecting in the radial direction by the positioning means T. Accordingly, the good braking performance can be obtained. Axial grooves 69 are formed on a top of the left end portion of the piston 61. Thus, a fluid path is formed between the rod portion 50a of the movable valve body 50 and the top end portion of the piston 61.

While the preferred embodiments have been described, variations thereto will occur to those skilled in the art within the scope of the present inventive concepts which are delineated by the following claims.

For example, in the above embodiment, the cut-out 44b is formed for throttling at the peripheral edge of the opening 44a of the seat member 44. Instead of the cut-out 44b, a smaller groove may be formed on the spherical surface 50b of the movable body 50. When the spherical surface of the movable valve body 50 contact with the peripheral edge of the central opening 44a of the seat member 44, the throttle means S is formed.

What is claimed is:

1. In a fluid pressure control apparatus for a vehicle including:
   (A) a main body in which an input opening is formed in communication with a master cylinder side and an output opening is formed in communication with a wheel cylinder side;
   (B) a stepped bore made in said main body, in communication with said input opening and output opening;
   (C) a stepped piston slidably fitted into said stepped bore, having a smaller diameter portion at the input opening side and a larger diameter portion at the output opening side;
   (D) throttle means for limiting fluid flowing from the wheel cylinder side of said output opening towards said input opening in response to a predetermined length movement of said stepped piston;
   (E) valve means for closing said path in response to a longer movement of said stepped piston then said predetermined length; and
   (G) an urging apparatus for urging said stepped piston in a direction to open said valve means, wherein, when said smaller diameter portion and said larger diameter portion receive an equal fluid pressure, said stepped piston is movable in a direction to close said valve means, and said valve means cooperates with said stepped piston and said urging apparatus so that, when the pressure of the fluid supplied from the master cylinder side towards the wheel cylinder side rises up to a control start pressure, said valve means closes and then repeatedly opens and closes with the forward and backward movement of said stepped piston for increasing the fluid pressure of the wheel cylinder side at a reduced rate relative to the fluid pressure of the master cylinder side, the improvement in which said urging apparatus comprises a first spring for always urging said stepped piston in the direction to open said valve means, and a second spring for urging said stepped piston in the direction to open said valve means i response to said movement longer than said predetermined length, said control start pressure being determined by the spring force of said second spring, and including means for compressing said second spring only after said stepped piston is subjected to movement to the input opening side for a distance longer than said predetermined length.

2. A fluid pressure control apparatus according to claim 1, in which said urging apparatus further comprises a spring retainer for receiving said second spring, said spring retainer comprising said means for compressing said second spring, said retainer being engageable with a stepped wall portion of said stepped bore, said stepped wall portion normally holding said retainer out of engagement with said stepped piston, and when said stepped piston is moved by longer than said predetermined length movement, said spring retainer being engageable with said stepped piston for urging said stepped piston in said direction, and said apparatus comprises positioning means which centers said spring retainer relative to said stepped piston, when said stepped piston has been moved by said longer length and said spring retainer engages with said stepped piston.

3. A fluid pressure control apparatus according to claim 1 or 2, in which spring force of said first spring is smaller than that of said second spring, and said first spring is so designed that said throttle means is made inoperative until the fluid pressure of the wheel cylinder rises up to a predetermined pressure which is lower than said control start pressure.

4. A fluid pressure control apparatus according to claim 2, in which said positioning means comprises a tapered flange portion of said stepped piston and a tapered edge of a central opening of said spring retainer, said tapered flange portion coming into contact with said tapered edge with said movement longer than the predetermined length.

5. A fluid pressure control apparatus according to claim 1, in which said throttle means comprises a poppet-type movable body arranged at the output opening side of said stepped piston, a spring for urging said poppet-type movable body towards said stepped piston, a seat member fixed to said main body, and a cut-out formed in a spherical portion of said movable body or in a peripheral edge of a central opening of said seat member.

6. A fluid pressure control apparatus according to claim 5, in which said valve means comprises a poppet-type valve body, a valve spring for urging said poppet-type valve body towards a top end of said stepped piston and a valve seat formed at said top end.

7. A fluid pressure control apparatus according to claim 1, in which said path is a through axial hole made in said piston.

* * * * *